United States Patent [19]

Canivenc et al.

[11] Patent Number: 5,025,053

[45] Date of Patent: Jun. 18, 1991

[54] DIORGANOPOLYSILOXANES CONTAINING DIBENZOYLMETHANE FUNCTIONAL GROUPS

[75] Inventors: Edith Canivenc, Lyon; Serge Forestier, Claye-Souilly; Michel Gay, Lyon; Gerard Lang, Saint-Gratien; Herve Richard, Paris, all of France

[73] Assignee: Rhone-Poulenc Chimie, Courbevoie, France

[21] Appl. No.: 389,780

[22] Filed: Aug. 4, 1989

[30] Foreign Application Priority Data

Aug. 4, 1988 [FR] France .................. 88 10778

[51] Int. Cl.$^5$ .................................................. C08K 5/24
[52] U.S. Cl. .................................... 524/265; 524/267;
528/15; 528/25; 528/26; 528/31; 556/436;
556/479
[58] Field of Search ................. 528/15, 31, 26, 25;
556/436, 479; 524/265, 267

[56] References Cited

U.S. PATENT DOCUMENTS

| | | | |
|---|---|---|---|
| 4,536,265 | 8/1985 | Fabrizio et al. | 528/26 |
| 4,940,765 | 7/1990 | Canivenc et al. | 524/267 |

FOREIGN PATENT DOCUMENTS

| | | |
|---|---|---|
| 0088842 | 9/1983 | European Pat. Off. . |
| 0202542 | 11/1986 | European Pat. Off. . |
| 0263038 | 4/1988 | European Pat. Off. . |
| 2513992 | 8/1983 | France . |

OTHER PUBLICATIONS

Die Makromolekulare Chemie, vol. 7, No. 5, Juin 1986, pp. 381–388, Basel, CH; S. Berg et al.: "Structural Variations of Liquid-Crystalline Polymers: Cross-Shaped and Laterally Linked Mesogens in Man Chain and Side Group Polymers", p. 383, Scheme 3.

*Primary Examiner*—Melvyn I. Marquis
*Attorney, Agent, or Firm*—Burns, Doane, Swecker & Mathis

[57] ABSTRACT

Linear and cyclic diorganopolysiloxanes containing dibenzoylmethane functional groups are well suited for the coating of optical fibers and for lubricating plastics, e.g., PVC.

8 Claims, No Drawings

DIORGANOPOLYSILOXANES CONTAINING DIBENZOYLMETHANE FUNCTIONAL GROUPS

BACKGROUND OF THE INVENTION

1. Field of the Invention

The present invention relates to novel diorganopolysiloxanes comprising a dibenzoylmethane functional group.

2. Description of the Prior Art

It is known to this art to modify diorganopolysiloxanes, whether along the polymer chain and/or at the end of the polymer chain, with various organic functional groups, with a view towards imparting specific properties to such silicone polymers.

A convenient technique for introducing these organic functional groups is to carry out a hydrosilylation reaction between a diorganopolysiloxane bearing at least one SiH group and an ethylenically unsaturated organic compound in the presence of a catalytically effective amount of a platinum catalyst.

Exemplary of such prior art are:

(i) U.S. Pat. Nos. 2,970,150 and 4,160,775, describing the addition of allyl or methallyl alcohol to a silane or diorganopolysiloxane bearing at least one SiH group;

(ii) U.S. Pat. Nos. 3,767,690 and 4,503,208, describing diorganopolysiloxanes bearing moieties containing an acrylate or methacrylate functional group;

(iii) U.S. Pat. No. 4,640,967, describing diorganopolysiloxanes bearing an epoxy and/or acrylate or methacrylate group and compositions comprised thereof for coating optical fibers; and (iv) Patent EP-A-0,088,842, describing diorganopolysiloxanes bearing benzophenone groups.

SUMMARY OF THE INVENTION

A major object of the present invention is the provision of novel diorganopolysiloxanes comprising particular organic functional groups, which novel diorganopolysiloxanes not only have a high refractive index permitting their incorporation into coating compositions for optical fibers, but also are suitable as a lubricant for plastic substrates, in particular for PVC.

Briefly, the present invention features modified diorganopolysiloxane polymers having the formula:

$$B-\underset{R}{\underset{|}{Si}}-O-\left[\underset{R}{\underset{|}{Si}}-O\right]_r-\left[\underset{A}{\underset{|}{Si}}-O\right]_s-\underset{R}{\underset{|}{Si}}-B \quad (1)$$

in which the symbols R, which may be identical or different, are each a $C_1$-$C_{10}$ alkyl, vinyl, phenyl or 3,3,3-trifluoropropyl radical, at least 80% of the number of the R radicals being methyl radicals; the symbols B, which may be identical or different, are each a radical R or a radical A; r is an integer ranging from 0 to 200, inclusive; s is an integer ranging from 0 to 50, inclusive, with the proviso that, if s is 0, at least one of the two symbols B is A; or having the formula:

$$\left[\underset{R}{\underset{|}{Si}}-O\right]_t\left[\underset{A}{\underset{|}{Si}}-O\right]_u \quad (2)$$

in which R is defined as in formula (1); u is an integer ranging from 1 to 20, inclusive; t is an integer ranging from to 20, inclusive; and t+u is equal to or greater than 3; and further wherein said formulae (1) and (2) the symbol A is a radical of the formula:

$$Z-\underset{Y}{\underset{|}{\bigcirc}}-C(=O)-CH_2-C(=O)-\bigcirc-X \quad (3)$$

in which X is a hydrogen atom, a linear or branched chain $C_1$-$C_8$ alkyl radical or a linear or branched chain $C_1$-$C_8$ alkoxy radical; Y is a hydrogen atom, a hydroxyl group or a $C_1$-$C_4$ alkoxy radical; and Z is a divalent radical of the formula:

$$-CH_2-CH(-CH_2)_p-(O)_m-W$$

in which m is 0 or 1, p is an integer ranging from 1 to 10, inclusive, and W is a hydrogen atom or a $C_1$-$C_4$ alkyl radical, with the proviso that, when m is equal to 0, Y is an alkoxy radical or OH and is situated in an ortho position with respect to Z.

DETAILED DESCRIPTION OF THE PREFERRED EMBODIMENTS OF THE INVENTION

More particularly according to the present invention, preferred are the random or block polymers of formulae (1) and (2) satisfying at least one of the following parameters:

R is methyl;
B is methyl;
r ranges from 5 to 20, inclusive;
s ranges from 2 to 15, inclusive;
t+u ranges from 3 to 10, inclusive;
X is H;
Y is H, OH or methoxy; and/or
Z is a divalent radical in which
m=0 or 1, p=1, and W=H or methyl.

To prepare the polymers of formulae (1) and (2), it is possible, for example, to use a starting material comprising the corresponding polymer in which all of the A radicals are hydrogen atoms.

This polymer is referred to in this art and herein as an SiH polymer; the SiH groups may be present in the polymer chain backbone and/or at the polymer chain ends. These SiH polymers are well known to the silicone art and are generally commercially available.

They are described, for example, in U.S. Pat. Nos. 3,220,972, 3,436,366, 3,697,473 and 4,340,709.

Such SiH polymers can be represented by the formula:

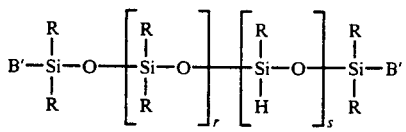
(4)

in which R, r and s are as defined above for formula (1) and the radicals B', which may be identical or different, are each a radical R or a hydrogen atom, and by the formula:

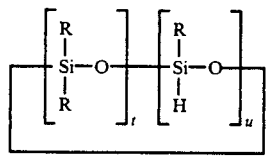
(5)

in which R, t and u are as defined above for formula (2).

A hydrosilylation reaction is then carried out between this SiH polymer of formulae (4) or (5), in the presence of a catalytically effective amount of a platinum catalyst, and an organic dibenzoylmethane compound of the formula:

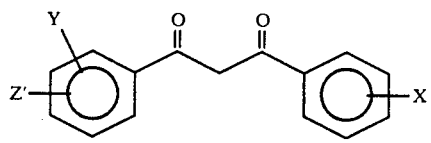
(6)

in which X and Y are as defined above as in formula (3), and Z' is the radical:

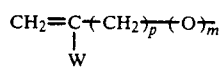

in which p, m and W are as defined in formula (3) above, with the proviso that, when m is equal to 0, Y is an OH or alkoxy radical and is in a position ortho to Z'.

The majority of the compounds of formula (6) are known to the art. They can be synthesized, in particular, according to the techniques summarized in: *Chemical Abstracts;* Vol. 58, 11316e; Vol. 93, 8051h; Vol. 101, 191435g and Vol. 94, 208660p. Such techniques are also described in FR-A-2,506,156, FR-A-2,513,992 and FR-A-526,658.

A suitable process when m=0 is the following:

During a first stage (a), acetophenone hydroxylated in position 2, 3 or 4 is reacted with an alkenyl halide of the formula:

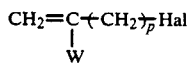
(7)

in which W and p are as defined above in formula (6) and Hal is a halogen atom, preferably chlorine or bromine, in the presence of a base, for example in the presence of an alkali or alkaline earth metal hydroxide or carbonate, or of an alkali metal amide, alcoholate or hydride, in a solvent compatible with the particular nature of the base, such as water or an organic solvent, for example an alcohol, dioxane, dimethyl sulfoxide or dimethylformamide, at a temperature ranging from ambient to the boiling point of the solvent, to produce a compound of formula:

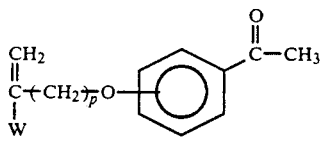
(8)

During a second stage (b) a Claisen rearrangement, described by Tarbell (Organic Reactions, Vol. 2, John Wiley, New York, page 1 (1944)) is carried out by heating the compound of formula (8) to at least approximately 170° C., optionally in the presence of a solvent, to produce the compound of formula:

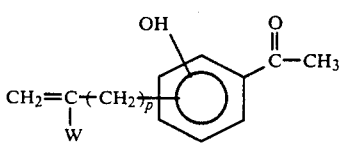
(9)

During a third stage (c), the compound of formula (9) is condensed in pyridine with the benzoyl chloride of the formula:

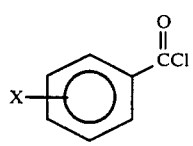
(10)

to produce a compound of the formula:

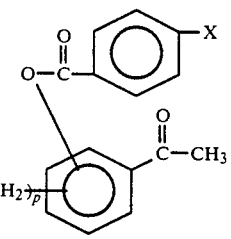
(11)

and the compound of formula (6), with m=0, is ultimately prepared by carrying out, during a fourth stage (d), a Baker Venkataraman rearrangement of the compound of formula (11) in the presence of potassium hydroxide and in pyridine.

The compounds of formula (6) in which m=0 or 1 and Y is other than OH are prepared by condensation of an ester of formula (12) with an acetophenone of formula (13):

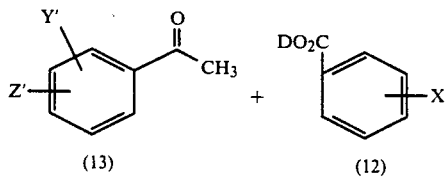

In the compound of formula (12), X is as defined above in formula (3) and D is a $C_1$-$C_6$ alkyl radical. In the compound of formula (13), Z' is as defined above in formula (6) and Y' is a hydrogen atom or a $C_1$-$C_4$ alkoxy radical. The reaction is carried out in the presence of a base, for example in the presence of an alkali metal alcoholate, hydride or amide, in a solvent compatible with the particular nature of the base, such as toluene, isopropyl ether, dioxane, tetrahydrofuran, 1,2-dimethoxyethane, dimethyl sulfoxide of dimethylformamide, at a temperature ranging from ambient to the boiling point of the solvent.

The acetophenone of formula (13) can be prepared by known techniques.

For example:

(i) when m=1 and Y'=H, the acetophenone is prepared according to the process described above for the preparation of compound (8);

(ii) when m=0 and Y'=$C_1$-$C_4$ alkoxy, the acetophenone is prepared by alkylation of the compound of formula (9) using a $C_1$-$C_4$ alkyl halide or sulfate according to the process described in stage (a) above.

The platinum catalysts used to carry out the hydrosilylation reaction of the polymers of formulae (4) or (5) with the organic compound of formula (6) are extensively described in the literature. Representative are, in particular, the complexes of platinum and an organic product described in U.S. Pat. Nos. 3,159,601, 3,159,602 and 3,220,972, and European Patents EP-A-57,459, EP-A-188,978 and EP-A-190,530, and the complexes of platinum and of a vinylated organopolysiloxane which are described in U.S. Pat. Nos. 3,419,593, 3,377,432 and 3,814,730.

To react the SiH polymer of formulae (4) or (5) with the compound of formula (6), an amount of platinum catalyst is typically used, calculated as the weight of platinum metal, ranging from 5 to 600 ppm, preferably from 10 to 200 ppm, based on the weight of the SiH polymer of formulae (4) or (5).

The hydrosilylation reaction can be carried out in bulk or in a volatile organic solvent such as toluene, heptane, xylene, tetrahydrofuran and tetrachloroethylene.

It is generally desirable to heat the reaction mixture to a temperature of from 60° to 120° C. for the time required to complete the reaction. Furthermore, the SiH polymer can be added dropwise to the compound of formula (6) in solution in an organic solvent, or else the SiH polymer and the compound of formula (6) can be added simultaneously to a catalyst suspension in the solvent.

Whether or not the reaction is complete is monitored by determining the residual SiH groups using alcoholic potassium hydroxide, and the solvent is then removed, for example by distillation under reduced pressure.

The crude oil obtained may be purified, for example by being cascaded through an absorbent column of silica.

The polymers of formulae (1) and (2) have a remarkably high refractive index. Therefore, they can be used, in particular mixed with the organic or organosilicon compositions employed for coating optical fibers, to produce a coating having a high index of refraction.

Furthermore, the polymers of formulae (1) or (2) are remarkable lubricants for various plastics, such as polyolefins, polyesters and especially PVC (polyvinyl chloride), and make it possible to prevent these plastics from adhering to processing tools and machines.

For this latter application, from 0.001 to 3 parts by weight of polymer are incorporated per 100 parts by weight of plastic before it is processed.

In order to further illustrate the present invention and the advantages thereof, the following specific examples are given, it being understood that same are intended only as illustrative and in nowise limitative.

EXAMPLE 1

Preparation of the random polymer of the formula

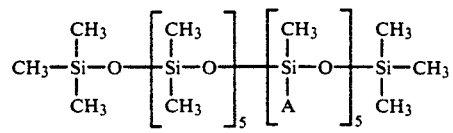

in which A is the radical of the formula:

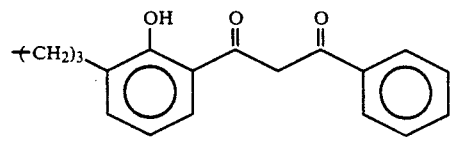

A solution in toluene (40 ml) of 3-allyl-2-hydroxydibenzoylmethane (12.6 g, 45 meq) and 5.12 g of the polymethylhydrodimethylsiloxane of the above formula, in which A was a hydrogen atom, was added dropwise over one hour, thirty minutes, to a suspension of platinum on charcoal at a concentration of 5% (70 mg) in dry toluene (5 ml) at 90°-100° C. under nitrogen and with stirring.

While the temperature was maintained from 100° to 105° C., stirring and refluxing were continued until the SiH groups had disappeared (absence of a band at 2,180 $cm^{-1}$ in the infrared spectrum), namely, 10 hours. The mixture was filtered through paper, the solvent was removed and the residue was washed three times with 80% ethanol. The oil obtained was taken up in chloroform, was dried over sodium sulfate and was filtered through Celite to remove the residues of colloidal platinum. After evaporating off the solvent, a thick orange-yellow oil was obtained (weight: 9.3 g, yield: 68%).

UV spectrum ($CHCl_3$:$\lambda$ max:346 nm, $\lambda$ max:365 nm.

Analysis by nuclear magnetic resonance ($^1H$ and $^{29}Si$ NMR) showed that this product was indeed the polymer of the above formula.

EXAMPLE 2

Preparation of a random polymer of the same formula as in Example 1 except that A was a radical of the formula

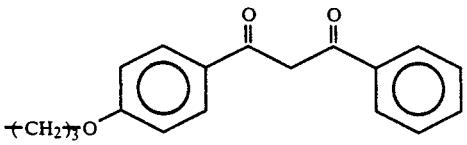

The operating procedure of Example 1 was repeated, but using 4-allyloxydibenzoylmethane (10 g, 36 meq) and 5.8 g of polymethylhydrodimethylsiloxane. A thick pale yellow oil was obtained (weight: 15 g, yield: 95%).

UV spectrum ($CHCl_3$):$\lambda$ max=353 nm.

Analysis by nuclear magnetic resonance ($^1H$ and $^{29}Si$ NMR) showed that this product was indeed a polymer of the predicted formula.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A diorganopolysiloxane comprising dibenzoylmethane functional groups and having one of the following formulae (1) or (2):

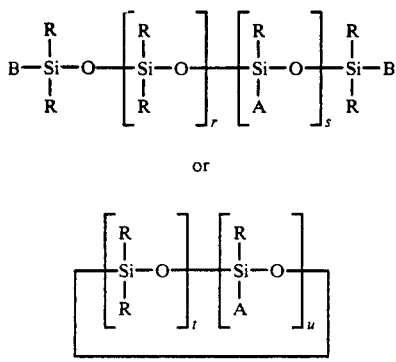

in which the symbols R, which may be identical or different, are each a $C_1$-$C_{10}$ alkyl, vinyl, phenyl or 3,3,3-trifluoropropyl radical, at least 80% of the number of the radicals R being methyl radicals; the radicals B, which may be identical or different, are each a radical R or a radical A defined below; r is an integer ranging from 0 to 200; s is an integer ranging from 0 to 50, with the proviso that, if s is 0, at least one of the two symbols B is A; u is an integer ranging from 1 to 20; t is an integer ranging from 0 to 20; t+u is equal to or greater than 3; and the symbol A is a radical of the formula:

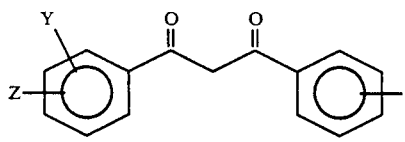

wherein X is a hydrogen atom, a linear or branched chain $C_1$-$C_8$ alkyl radical or a linear or branched chain $C_1$-$C_8$ alkoxy radical; Y is a hydrogen atom, a hydroxyl group or a $C_1$-$C_4$ alkoxy radical; and Z is a divalent radical of the formula:

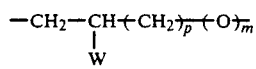

in which m is 0 or 1, p is an integer ranging from 1 to 10 and W is a hydrogen atom or a $C_1$-$C_4$ alkyl radical, with the proviso that, when m is equal to 0, Y is an alkoxy radical or OH and is situated in a position ortho to Z.

2. The diorganopolysiloxane as defined by claim 1, wherein R is methyl; B is methyl; r ranges from 5 to 20; s ranges from 2 to 15; t+u ranges from 3 to 10; X is H or methoxy; Y is H, OH or methoxy when m=1; Y is OH or methoxy when m=0; and Z is a divalent radical in which m equals 0 or 1, p equals 1 and W is H or methyl.

3. The diorganopolysiloxane as defined by claim 1, having the formula (1).

4. The diorganopolysiloxane as defined by claim 1, having the formula (2).

5. An optical fiber coated with the diorganopolysiloxane as defined by claim 1.

6. A plastic substrate comprising a lubricating amount of the diorganopolysiloxane as defined by claim 1.

7. A composition of matter comprising polyvinyl chloride and from 0.001 to 3 parts by weight of the diorganopolysiloxane as defined by claim 1.

8. A process for the preparation of the diorganopolysiloxane as defined by claim 1, comprising hydrosilylating, in the presence of a catalytically effective amount of a platinum compound, an SiH polymer having one of the following formulae (4) or (5):

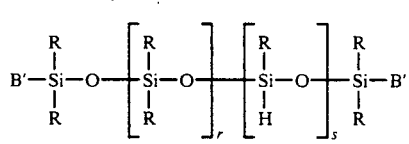

in which the radicals B', which may be identical or different, are each a radical R or a hydrogen atom, or

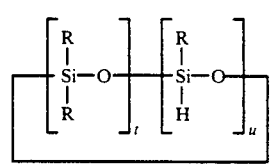

with an organic dibenzoylmethane compound of the formula:

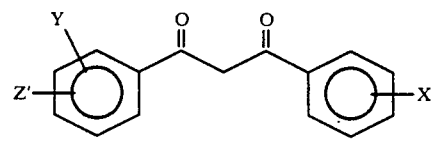

wherein Z' is the radical:

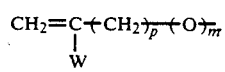

* * * * *